United States Patent [19]

Kato

[11] Patent Number: 5,541,923

[45] Date of Patent: Jul. 30, 1996

[54] DATA TRANSFER METHOD AND APPARATUS

[75] Inventor: Masaaki Kato, Kanagawa, Japan

[73] Assignee: Sony Corporation, Tokyo, Japan

[21] Appl. No.: 379,745

[22] Filed: Jan. 27, 1995

[30] Foreign Application Priority Data

Jan. 31, 1994 [JP] Japan .................................. 6-027405

[51] Int. Cl.$^6$ .................................................. H04Q 11/04
[52] U.S. Cl. ...................................... 370/85.1; 340/825.15; 364/243.6; 395/865
[58] Field of Search .......................... 370/77, 85.1, 85.6, 370/110.1; 340/825.06, 825.07, 825.1, 825.15; 364/228.1, 243.6, 246.3; 395/850, 865

[56] References Cited

U.S. PATENT DOCUMENTS 5,299,189  3/1994  Takahashi ................................ 370/58.2
5,440,558  8/1995  Ban ........................................ 370/85.1

*Primary Examiner*—Melvin Marcelo
*Attorney, Agent, or Firm*—William S. Frommer; Alvin Sinderbrand

[57] ABSTRACT

A method for transferring data between plural devices and a memory having address areas associated with the plural devices. The method includes the steps of sequentially reading out the functional information from a table memory having the functional information indicating plural functions concerning the accessing to the devices and control operations, selecting the functions corresponding to the read-out functional information, and performing a control operation in accordance with the selected functions. An apparatus for transferring data between plural devices and a memory having address areas associated with these plural devices is also disclosed. With the present method and apparatus, data transfer may be performed flexibly in order to comply with the request for a dedicated operation or in order to eliminate wasteful time consumption for a time frame during which the operation is at a standstill.

5 Claims, 6 Drawing Sheets

| ADDRESS | FUNCTIONAL INFORMATION |
|---|---|
| 0 | 0 |
| 1 | 511 |
| 2 | 509 |
| 3 | 509 |
| 4 | 509 |
| 5 | 509 |
| 6 | 509 |
| 7 | 509 |
| 8 | 1 |
| 9 | 510 |
| 10 | 509 |
| 11 | 509 |
| 12 | 509 |
| 13 | 509 |
| 14 | 509 |
| 15 | 509 |
| 16 | 2 |
| 17 | 510 |
| 18 | 509 |
| 19 | 509 |
| 20 | 509 |
| 21 | 509 |
| 22 | 509 |
| 23 | 509 |
| 24 | 3 |
| 25 | 510 |
| 26 | 509 |
| 27 | 509 |
| 28 | 509 |
| 29 | 509 |
| 30 | 509 |
| 31 | 509 |
| 32 | 4 |
| 33 | 511 |
| 34 | 509 |
| ⋮ | ⋮ |
| 498 | 509 |
| 499 | 509 |
| 500 | 509 |
| 501 | 509 |
| 502 | 509 |
| 503 | 509 |
| 504 | 63 |
| 505 | 510 |
| 506 | 509 |
| 507 | 509 |
| 508 | 509 |
| 509 | 509 |
| 510 | 509 |
| 511 | 509 |

CONTENTS OF SLOT TABLE

FIG.1

| ADDRESS | FUNCTIONAL INFORMATION |
|---|---|
| 0 | 0 |
| 1 | 511 |
| 2 | 509 |
| 3 | 509 |
| 4 | 509 |
| 5 | 509 |
| 6 | 509 |
| 7 | 509 |
| 8 | 1 |
| 9 | 510 |
| 10 | 509 |
| 11 | 509 |
| 12 | 509 |
| 13 | 509 |
| 14 | 509 |
| 15 | 509 |
| 16 | 509 |
| 17 | 510 |
| 18 | 509 |
| 19 | 509 |
| 20 | 509 |
| 21 | 509 |
| 22 | 509 |
| 23 | 509 |
| 24 | 509 |
| 25 | 510 |
| 26 | 509 |
| 27 | 509 |
| 28 | 509 |
| 29 | 509 |
| 30 | 509 |
| 31 | 509 |
| 32 | 509 |
| 33 | 511 |
| 34 | 509 |
| ⋮ | ⋮ |
| 498 | 509 |
| 499 | 509 |
| 500 | 509 |
| 501 | 509 |
| 502 | 509 |
| 503 | 509 |
| 504 | 509 |
| 505 | 510 |
| 506 | 509 |
| 507 | 509 |
| 508 | 509 |
| 509 | 509 |
| 510 | 509 |
| 511 | 509 |

CONTENTS OF SLOT TABLE

FIG.2

| ADDRESS | FUNCTIONAL INFORMATION |
|---|---|
| 0 | 0 |
| 1 | 511 |
| 2 | 0 |
| 3 | 0 |
| 4 | 0 |
| 5 | 0 |
| 6 | 0 |
| 7 | 0 |
| 8 | 1 |
| 9 | 510 |
| 10 | 0 |
| 11 | 0 |
| 12 | 0 |
| 13 | 0 |
| 14 | 0 |
| 15 | 0 |
| 16 | 2 |
| 17 | 510 |
| 18 | 0 |
| 19 | 0 |
| 20 | 0 |
| 21 | 0 |
| 22 | 0 |
| 23 | 0 |
| 24 | 3 |
| 25 | 510 |
| 26 | 0 |
| 27 | 0 |
| 28 | 0 |
| 29 | 0 |
| 30 | 0 |
| 31 | 0 |
| 32 | 4 |
| 33 | 511 |
| 34 | 0 |
| ⋮ | ⋮ |
| 498 | 0 |
| 499 | 0 |
| 500 | 0 |
| 501 | 0 |
| 502 | 0 |
| 503 | 0 |
| 504 | 63 |
| 505 | 510 |
| 506 | 0 |
| 507 | 0 |
| 508 | 0 |
| 509 | 0 |
| 510 | 0 |
| 511 | 0 |

CONTENTS OF SLOT TABLE

FIG.3

| ADDRESS | FUNCTIONAL INFORMATION |
|---|---|
| 0 | 510 |
| 1 | 511 |
| 2 | 510 |
| 3 | 510 |
| 4 | 510 |
| 5 | 510 |
| 6 | 510 |
| 7 | 510 |
| 8 | 510 |
| 9 | 510 |
| 10 | 510 |
| 11 | 510 |
| 12 | 510 |
| 13 | 510 |
| 14 | 510 |
| 15 | 510 |
| 16 | 510 |
| 17 | 510 |
| 18 | 510 |
| 19 | 510 |
| 20 | 510 |
| 21 | 510 |
| 22 | 510 |
| 23 | 510 |
| 24 | 510 |
| 25 | 510 |
| 26 | 510 |
| 27 | 510 |
| 28 | 510 |
| 29 | 510 |
| 30 | 510 |
| 31 | 510 |
| 32 | 510 |
| 33 | 511 |
| 34 | 510 |
| ⋮ | ⋮ |
| 498 | 510 |
| 499 | 510 |
| 500 | 510 |
| 501 | 510 |
| 502 | 510 |
| 503 | 510 |
| 504 | 510 |
| 505 | 510 |
| 506 | 510 |
| 507 | 510 |
| 508 | 510 |
| 509 | 510 |
| 510 | 510 |
| 511 | 510 |

CONTENTS OF SLOT TABLE

DATA TRANSFER METHOD AND APPARATUS

BACKGROUND OF THE INVENTION

This invention relates to a method and an apparatus for data transfer. More particularly, it relates to a method and an apparatus for parallel data transfer between plural slave units and/or plural objects of data transfer different from the slave units.

In conventional learning apparatus, such as those used in language laboratory systems, speech is used as the teaching material. In certain learning apparatus, a memory is employed as means for recording/reproducing the speech of the teaching material. When storing the speech in the memory in such learning apparatus, the teaching material is divided into pre-set speech units which are stored in pre-set storage areas in the memory with data appended thereto for indicating the storage sequence.

The language laboratory system is made up of the learning apparatus and plural terminals for use by pupils. After hearing the reproduced speech corresponding to data transferred from the learning apparatus to the terminals, the pupils practice pronunciation after the speech they have heard. The learning apparatus hold the speech the pupils have uttered on memory. The teachers reproduce the speech uttered by the pupils to check for the results of training in pronunciation. There has been known a learning apparatus in which data is transferred between plural teaching material storage units for storing the files of the teaching material possessed by the teacher and plural slave units equivalent to plural terminals for improving learning effects.

When handling 64 kbps×N-tuple speed data in the conventional data transfer apparatus employed as the teaching apparatus where N>1, it is necessary to follow the data sequence even with multiple-speed reproduction, by way of being subject to design limitations concerning the multiple number N or limitations as to the circuitry designed for increasing the number of addresses for coping with the multiple speeds.

SUMMARY OF THE INVENTION

In view of the foregoing, it is an object of the present invention to provide a method and an apparatus for data transfer in which processing operations other than data transfer may be flexibly executed during the time data transfer is not going on, while observing the data transfer sequence to the slave units.

It is another object of the present invention to provide a method and an apparatus for data transfer in which a variety of real-time processing operations may be flexibly executed even if data transfer or functional processing by a sole control unit becomes difficult to perform or complicated processing operations are involved.

In one aspect, the present invention provides a method for transferring data between plural devices and a memory having address areas associated with the plural devices. The method includes the steps of sequentially reading out the functional information from a table memory having written therein the functional information indicating plural functions concerning the accessing to the devices and control operations executed by the apparatus and selecting the functions corresponding to the read-out functional information. The method also includes the steps of performing a control operation in accordance with the selected functions.

In another aspect, the present invention provides an apparatus for transferring data between plural devices and a memory having address areas associated with the plural devices. The apparatus includes a plurality of memories, and a plurality of recording/reproducing means for recording/reproducing data. The apparatus also includes first control means for entering or outputting data between the memories and the recording/reproducing means and for controlling the accessing of at least these devices, and a plurality of second control means for controlling data input/output between the recording/reproducing means and the memories. The apparatus also includes table memory means having written therein the functional information indicating plural functions concerning the accessing to the devices and control operations executed by the apparatus, and means for supplying the address information to the table memory means. The apparatus further includes address generating means for generating the address information for a plurality of slave units associated with the memories based on the functional information of the table memory means, and decoding means for outputting function selection signals corresponding to a plurality of units of the functional information outputted by the table memory means.

BRIEF DESCRIPTION OF THE DRAWINGS

FIG. 1 illustrates typical contents of a slot table employed in the data transfer method according to the present invention.

FIG. 2 is illustrates another example of the slot table employed in the data transfer method of the present invention.

FIG. 3 is illustrates still another example of the slot table employed in the data transfer method of the present invention.

FIG. 4 is illustrates yet another example of the slot table employed in the data transfer method of the present invention.

DETAILED DESCRIPTION OF THE PREFERRED EMBODIMENT

Figure 5:
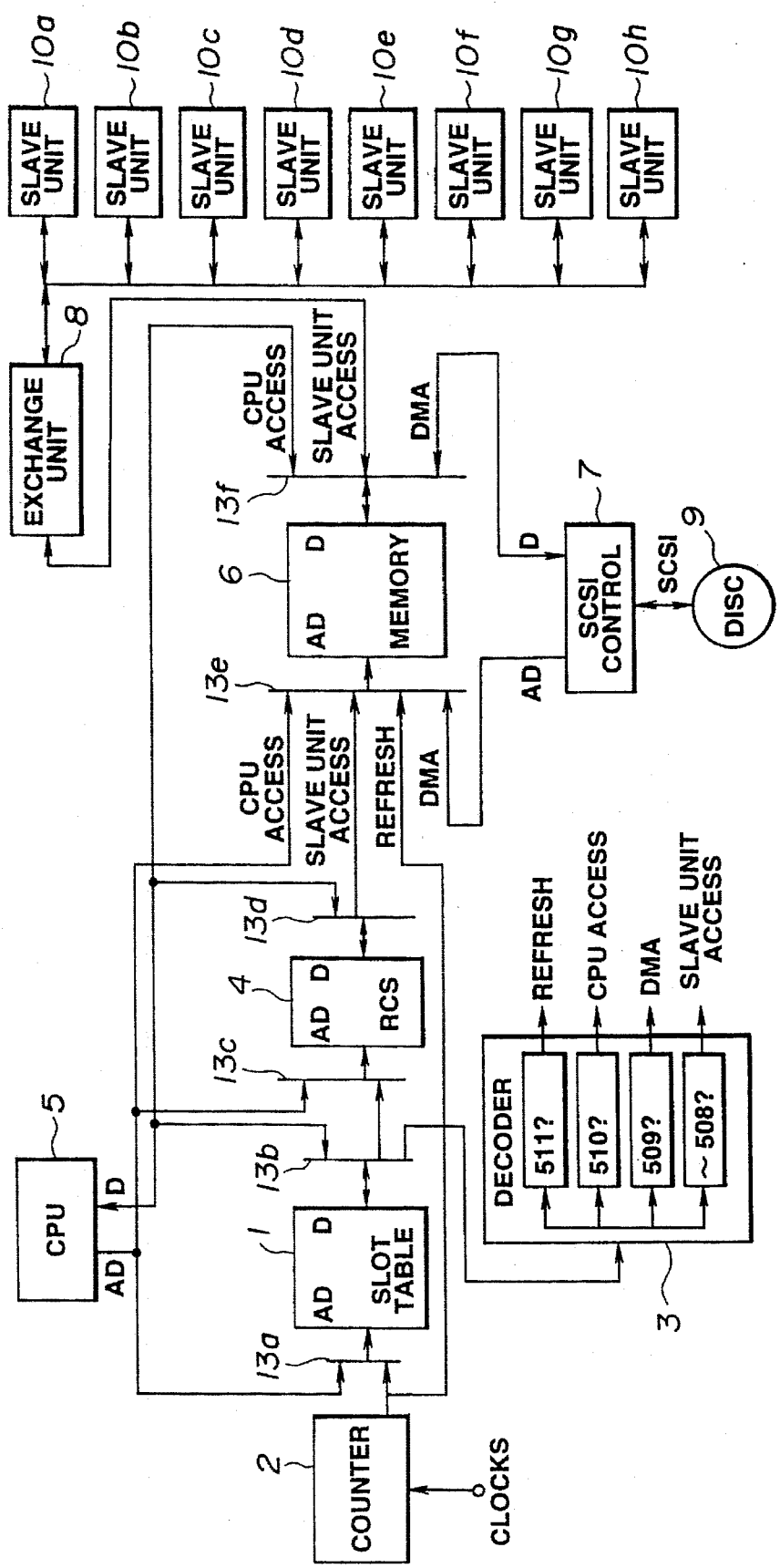
FIG. 5 is a schematic block diagram showing a first data transfer apparatus according to the present invention.

Referring to the drawings, preferred embodiment of the method and apparatus for data transfer according to the present invention will be explained in detail.

In the present embodiment, the present invention is applied to a server for furnishing learning materials for a learning apparatus in which data can be transmitted and received reciprocally and in which data needs to be supplied on the real-time basis.

For explaining the data transfer method, time-multiplexing setting is first explained. In the present data transfer method, the time necessary for completing cyclic data transfer to respective slave units is termed a frame. In the present embodiment, each frame is set to 125 μsec. The time fraction obtained by dividing a frame by N is termed a sub-frame or slot. In the present embodiment, the value of N is set to 64. Thus the slot period is 1.9 μsec. To the 64 slots are allocated slot numbers of from 0 to 63.

Each sub-frame or slot is time-multiplexed into eight sub-slots. Consequently, each sub-slot period is 244 nsec. The total number of the sub-slots in each frame is 64×8=512. If the frame is time-multiplexed in this manner, the reference period, for example, the period of a slot having a slot number of zero, is unchanged at 125 μsec.

Referring to FIGS. 1 to 4, the first data transfer method is explained.

In a slot table, corresponding to one frame in the above-mentioned data transfer, 512 numbers for 512 functional information units are recorded, as shown for example in FIG. 1. For the numbers recorded in the slot table, respective functions shown in Table 1 are defined. That is, addresses of from 0 to 512 are entered in the slot table, with a region indicated by one of the addresses corresponding to the above-defined sub-slot.

TABLE 1

Relation between Functional Information and Functions

| Functional Information | Functions |
| --- | --- |
| 511 | DRAM refresh |
| 510 | CPU access |
| 509 | DMA access |
| 0–508 | slave unit access |

It is noted that the numbers available for the slave units are from 0 to 508. Slot numbers # from 0 to 63 are allocated to the slots. In the storage areas associated with respective sub-slots in the slot table, the desired functional information can be recorded by the CPU responsive to the user's request whereby the contents of the slot table are re-recorded. A typical re-recording of the functional information is now explained.

In the slot table of FIG. 1, addresses of from 0 to 7 are assigned to a storage region corresponding to a slot 0. In FIG. 1, the functional information 0 is recorded in the storage region having the address 0, while the functional information 511 is recorded in the storage region having the address 1. The functional information 509 is recorded in each of the recording regions of from address 2 to address 7.

As is apparent from the definition in Table 1, the number of the slave unit to be accessed is written in the address 0 storage area in the slot table shown in FIG. 1. Similarly, the effect that the memory refresh operation is to be performed is written in the address 1 storage area and the effect that accessing is to be made to small computer system interface (SCSI) and to direct memory access (DMA) is written in the storage areas of the address 2 to address 7 of the slot table. By periodically incrementing and accessing the addresses of the slot able shown in FIG. 1 from 0 to 511, accessing to slave units for data input/output, memory refresh/CPU accessing and accessing to DMA to SCSI may be executed sequentially.

In the slot table shown in FIG. 2, accessing to the connected slave unit is written in the storage areas of the addresses 0 and 8 in the slots 0 and 1. The functional information 509 is written in the storage area associated with the first sub-slot within each of 62 slots except the addresses 0 and 8. That is, the data transfer ability for 62 data per frame is distributed to DMA.

The slot table shown in FIG. 3 shows that if only the slave unit 0 among the 64 slave units requests data in the sub-slots other than the second sub-slot of respective slots, DMA is not executed and the ability allocated to 484 sub-slots can be distributed in its entirety to the slave unit 0.

Furthermore, when writing data in the memory and checking the written data by way of executing the verification operation, the operation other than refresh set in the first slot is set for accessing the CPU. This setting permits memory self-diagnosis to be performed.

By writing the functional information in the slot table, decoding the thus written functional information and sequentially executing the resulting functions, it becomes possible with the first data transfer method to set the function freely in each sub-slot. Thus it becomes possible to distribute the data transfer ability within one frame time to the defined functions and to combine the functions to improve the function or to enable complex operations to be performed in addition to the usual throughput of slave units.

The second data transfer method of the present invention is now explained. In the present second data transfer method, the present invention is applied to data transfer between plural slave units and plural disc devices.

Within the second data transfer method, plural memory devices are used, and data input/output is executed between these memory devices and plural disc devices having the DMA function. Plural second control units are used to control data input/output between a first control unit controlling the accessing of plural slave units, plural disc devices and plural memory units. With the present data transfer method, a slot table is provided in which the first functional information units "0 to 508" indicating slave units for which data transfer is to be executed within the time-multiplexed time frame and the second functional information "509" indicating the disc device to be accessed by DMA, as the object of DMA and as data transfer objects other than the above-mentioned slave unit, are written. Data transfer is carried out by sequentially reading out data from the slot table, controlling the operation for the first functional information units "0 to 508" by the first control unit based on the read-out functional information and by controlling the operation of the function corresponding to the second functional information, such as the functional information "509", by the plural second control units.

Specifically, accessing the plural slave units as different objects of the data transfer and DMA to SCSI conversions are separately carried out by the first control unit and by the second plural control units, respectively. Since it is necessary to distinguish these two control operations by judging which of these two control operations is to be performed, there is written the functional information indicating an object to be accessed in the storage areas associated with the addresses of the slot table. By reading out the functional information written in the slot table, and by distinguishing the associated objects to be accessed, the operation control which is time-divisionally in concert can be performed even if plural data is transferred or plural functional objects are accessed, so that data transfer or accessing may be made for plural channels.

By combining plural control operations by utilizing the second data transfer method, it becomes possible to improve the system throughput as well as the degree of freedom of data transfer even through certain limitations are imposed on the single control operation.

In the present data transfer method, the slot table is re-written by writing the functional information indicating the object of data transfer, that is the object to which the data is desired to be transferred, in the storage area associated with each address of the slot table.

Referring now to the block diagram of FIG. 5, a data transfer apparatus according to a first embodiment of the present invention is explained. The data transfer apparatus according to the present embodiment is referred to herein as a first data transfer apparatus.

In FIG. 5, the first data transfer apparatus includes a slot table 1 in which there is written the functional information units indicating the functions to be carried out in each time-multiplexed time frame and a counter 2 for supplying the address information to the slot table 1. The apparatus also includes a decoder 3 for outputting the functional control signals corresponding to the functional information units outputted by the slot table 1. The apparatus further includes a real-time control storage (RCS) 4 for generating the address information units for plural devices as objects of data transfer for a memory 6 based on the functional information in the slot table 1.

The first data transfer apparatus also includes a CPU 5 for controlling the setting of data or the address information, the memory 6 to or from which data at the address positions of the functions corresponding to the function selection signals from the decoder 3 are entered or outputted. The apparatus further includes a SCSI controller 7 for controlling the SCSI (small computer system interface), an exchange unit 8 for data exchange between the memory 6 and the slave units and a disc device 9 as a storage device. To the data transfer apparatus, there are connected eight slave units 10a to 10h in parallel via the exchange unit 8.

The slot table 1 has the functional information as to which of the slots in one frame is to be associated in order to effect reciprocal data transfer with the slave units with the throughput of the slave units being taken into account. With the aid of the first data transfer method, the functional information can be set in the slot table 1 so that variable throughputs may be achieved for respective slave units. For setting the slot table, the sub-slots as time frames are associated with the addresses in the slot table 1. In the storage area associated with the addresses of the slot table 1, there are supplied data corresponding to the address values of the RCS 4 from the CPU 5 so as to be written therein. In this manner, the data as the functional information is written in the slot table 1. One of the address information supplied from the counter 2 and that supplied from the CPU 5 is supplied to the slot table 1 depending on the operating mode.

The counter 2 is supplied with signals from an oscillator, not shown. The counter 2 performs counting using signals from the oscillator as clocks, and routes the count values to address information selectors 13a and 13e provided at input sides of the memory 6 and to the slot table 1. The counter 2 synchronizes the operations of various parts of the first data transfer apparatus.

The decoder 3 decodes output data of the slot table 1, that is the functional information, and generates a selection control signal indicating the function to be performed within the sub-slot time. The selection control signal thus generated is routed to the selectors 13a and 13e. The decoder B outputs selection control signals for carrying out accessing to the slave units, DMA, accessing to the CPU and refreshing of the memory 6 when the functional information units are 0 to 508, 509, 510 and 511, respectively.

The RCS 4 is a memory for storing a table for the information concerning the data write/readout area (storage area) of the memory e for each slave unit. To the RCS 4 is supplied the address information of the slot table 1 or the address information of the CPU 5, whichever has been selected. The RCS 4 exchanges data with the memory 6 via data input/output selectors 13d and 13e. In the operation of the RCS 4, the RCS reads the contents of the slot table 1 during the former half period of each sub-frame to generate an address and a write/read control signal. The RCS 4 routes the address to the memory 6 during the latter half period of the sub-frame to effect writing/readout. The storage regions of the memory 6 can be accessed by sequentially performing the above operations. With the above operation, the greater the number of assignments of a given slave unit in the slot table 1, the greater the number of access the slave unit has to the memory 6, thus increasing the throughput of the slave unit.

The CPU 5 routes the address information AD and data D to various parts of the apparatus for controlling their operations. That is, the address information AD from the CPU 5 is supplied to the slot table 1, selectors 13a, and 13e provided on the address input sides of the memory 6 and to the selector 13c on the address input side of the RCS 4. The CPU 5 exchanges data D with the memory 6 via a data input/output selector 13f.

The memory 6 is fed via the address information selector 13e with addresses supplied from the counter 2, RCS 4, CPU 5 and from the SCSI control unit 7. The address information selector 13e selects one of the addresses from the CPU 5, counter 2, RCS 4 and the SCSI controller 7. The memory 6 effects data writing/readout to or from the storage area associated with the addresses via the data input/output selector 13f.

The data input/output selector 13f selects, based on the selection control signal from the decoder 3, the origin of transfer and the destination of transfer in the reciprocal data transfer between the memory 6 on one hand and the CPU 5, the slave units 10a to 10h connected to the memory 6 via the exchange unit 8 and the disc device 9 connected to the memory 6 via the SCSI control unit 7, on the other hand.

The SCSI control unit 7 effects data exchange between the disc device 9 and the memory 6, while routing the address AD via an address information selector 13e to the memory 6.

The exchange unit 8 effects data exchange between the memory 6 and the slave units 10a to 10h. The time-divisionally allocated slot numbers # are associated with the sequence of the slave units 10a to 10h.

The slave units 10a to 10h are terminals for reciprocal data exchange with the first data transfer apparatus. That is, the slave units 10a to 10h transform the signals, such as audio or video signals, into data by a cordec by way of performing data exchange.

The operation of the first data transfer apparatus is now briefly explained.

The first data transfer apparatus is adapted to time-divisionally perform a variety of real-time operations, such as accessing to the memory 6 or the disc device 9 vi the CPU 5 as DMA within the apparatus, refreshing the memory 6 and accessing to the slave units 10a to 10h. For realizing such operation, the first data transfer apparatus routes the address information supplied from the CPU 5 to the slot table 1 for designating the address in the slot table 1. The slot table 1 writes data outputted by the CPU 5 or the memory 6 at the designated address. When the number of the slave unit, for example, is written in the slot table 1, the numbers 0 to 508 are written with the addresses of the RCS 4 as the functional information units. The remaining functional information is also written in the associated addresses so as to be set in the slot table 1.

In the operation according to the above setting, the counter 2 routes a count value to the slot table 1. The functional information units of the addresses corresponding to the count values are cyclically read out one by one from the slot table 1. The decoder 3 decodes the functional information units and routes selection control signals to the selectors 13e and 13f.

The address information selector 13e is responsive to the selection control signal from the decoder 3 to select the address and routes the selected address to the memory 6, which then inputs or outputs data based on the address. Thus, in case of a sub-slot for which accessing to the slave unit is selected, the memory 6 exchanges data with the associated slave unit via the exchange unit 8. In case of a sub-slot for which accessing to the CPU 5 is selected, the memory 6 exchanges data with the CPU 5. In case of a sub-slot for which accessing to the memory 6 is selected, the memory 6 refreshes the contents of the designated address. If DMA, that is accessing to the disc device 9, is selected, the SCSI control unit 7 routes the address information AD to the memory 6 to effect reciprocal data transfer between the memory 6 and the disc device 9.

With the above-described first data transfer apparatus, by writing the functional information for realizing the above operation in the slot table 1 for assigning the functional information in a sub-slot subdivided from the slot as a time-multiplexed time frame and by arraying the functional information in the storage region of the temporally corresponding address, it becomes possible to enable free changes in the operation irrespective of the original design setting.

Consequently, since it becomes possible to control the number of slots assigned per frame depending on the importance attached to a given operation, the degree of freedom or system flexibility can be improved with a system employing the present first data transfer apparatus.

Referring to the schematic block diagram of FIG. 6, a data transfer apparatus according to a second embodiment of the present invention will now be explained. The data transfer apparatus according to the present second embodiment is referred to herein as a second data transfer apparatus, and parts or components common to those of the first embodiment are denoted by the same reference numerals and the corresponding explanation is not made.

Figure 6:
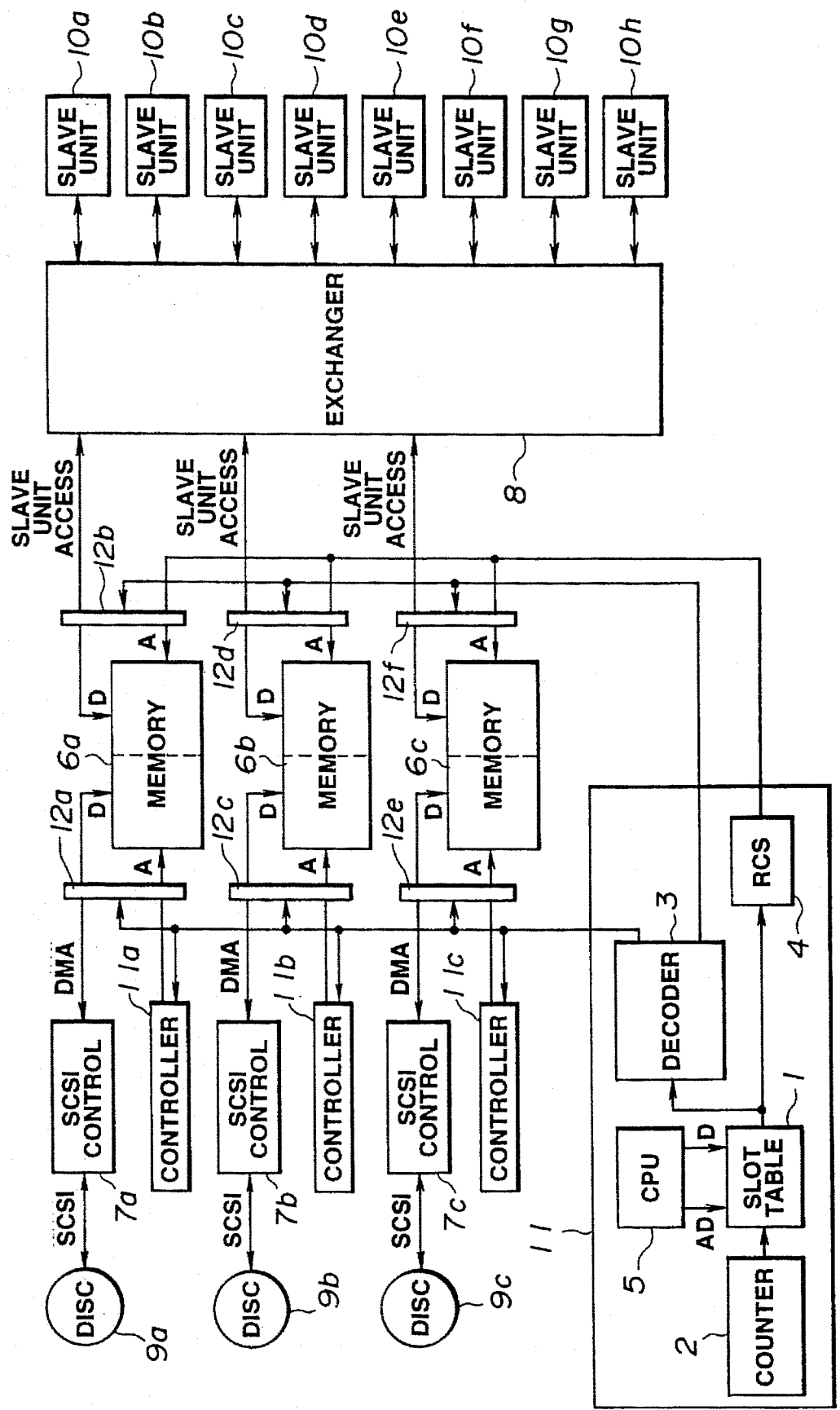
FIG. 6 is a schematic block diagram showing a second data transfer apparatus according to the present invention.

Referring to FIG. 6, the second data transfer apparatus includes a controller 11 made up of a slot table 1, a counter 2, a decoder 3, a RCS 4 and a CPU 5, and controllers 11a, 11b, and 11c, as second control means, for controlling the operation of data input/output between plural disc storage units 9a, 9b, 9c having a DMA function represented by the second functional information from the decoder 3 and memories 6a, 6b and 6c.

As shown in FIG. 6, the controllers 11, 11a, 11b and 11c are connected to the disc devices 9a, 9b and 9c acting as data storage means. Data having supplied address positions are entered in or outputted from these disc devices.

The controller 11 has the slot table 1, decoder 3, counter 2 and the RCS 4 as explained in connection with the first data transfer apparatus. The controllers 11a, 11b and 11c perform control operations in accordance with selection control signals corresponding to the functional information selected by the decoder 3 within the controller 11.

In association with these controllers 11a, 11b and 11c, the second data transfer apparatus includes the memories 6a, 6b and 6c, SCSI controllers 7a, 7b, 7c, the disc devices 9a, 9b and 9c and selectors 12a to 12f which may be used simultaneously for the addressing information and data input/output. Each of the memories 6a, 6b and 6c is a dual port RAM performing a pseudo-operation on a time division basis. Each of the memory devices 6a, 6b and 6c has its memory area divided in two for coping with the combination of the controller 11 and one of the controllers 11a to 11c. The second data transfer apparatus is connected to eight slave units 10a to 10h via the exchange unit 8.

The operation of the second data transfer apparatus will be briefly explained.

With the present second data transfer apparatus, each frame is divided into 64 slots, with each slot as a sub-frame being divided into eight sub-slots of equal size. The total number of the time-divisionally assigned sub-slots is 512. The slot table 1 has addresses of from 0 to 511 corresponding to the total number of the sub-slots. The functional information is set in the slot table 1 by the same operation as that for the first data transfer apparatus. The number of the slave units that can be connected to the second data transfer apparatus is determined by the number of slots in a frame. Thus the number of the slave units that can be connected in the present case is 64.

The slot table 1 outputs the functional information of the storage area corresponding to the count value of the counter 12 to the decoder 3 and to the RCS 4. The decoder 3 decodes the functional information to generate a selection control signal which is supplied to each of the selectors 12a to 12f and to each of the controllers 11a to 11c.

When fed with the functional information 511, the decoder 3 outputs the selection control signal for refreshing the memories 6a to 6c. When fed with the functional information 510 from the slot table 1, the decoder 3 outputs a selection control signal for accessing the memories 6a to 6c and the CPU 5. Also, when fed with the functional information 509 from the slot table 1, the decoder 3 outputs a selection control signal for accessing the controllers 11a to 11c in order to enable data exchange by DMA between the disc devices 9a to 9c and the memories 6a to 6c via the SCSI control units 7a to 7c. Furthermore, when fed with the functional information units 0 to 508 from the slot table 1, the decoder 3 outputs a selection control signal to each of the selectors 12b, 12d and 12f for accessing the slave units 10a to 10h. In effect, the numbers 0 to 63 are affixed to the slave units. The selectors 12b, 12d and 12f are responsive to the selection control signal to control the input of the address A and the data D to the memories 6a to 6c.

In the present embodiment, data exchange with the objects of data transfer, that is the slave units, is controlled by the controller 11, while data exchange with the disc devices 9a to 9c is controlled by the controllers 11a to 11c. For such control distribution, the functional information indicating the accessing of the slave units 0 to 508 and the functional information indicating DMA 509 are employed. The decoder 3 decodes and distributes the functional information so that the functional operation is performed time-divisionally by the respective controllers operating in unison. In the present embodiment, three functions are executed in parallel (simultaneously) by the controllers 11a to 11c. Thus the second data transfer apparatus is actuated with an ability thrice that of the first data transfer apparatus.

Once the various functional information is set in the slot table 1 as explained in connection with FIGS. 2 to 4, the practical operation in the second data transfer apparatus is in agreement with the set functional information, as in the fist data transfer apparatus, such that the operation of the second data transfer apparatus can be changed freely by software.

With the above-described arrangement, not only can the operation of the apparatus be changed by software as the occasion may demand, but also the operation of the plural controllers occurs in unison, thus leading to improved degree of freedom and flexibility of the data transfer apparatus.

The second data transfer apparatus can be modified in the following manner. For example, the same function may be realized by supplying the selection control signal of the decoder 3 to a device, such as a disc device, having a controller. Such arrangement is more practical than when plural controllers are arranged in the inside of the apparatus with extensibility, although it is necessary to synchronize the respective disc devices.

It is also possible to arrange a slot table in each of the controllers 11a to 11c and to common functional information which is related to the slots or sub-slots for executing the operation of the functions taking place in concert and in synchronism with one another as well as to set independent functions other than these slot- or sub-slot related common functions. This leads to more efficient operation of the data transfer apparatus.

Although the object to be controlled by the second control unit in the above-described embodiment is the disc device having the DMA function, it is possible to transfer data on the realtime basis even when the devices other than the disc devices are controlled by the second control unit.

It is seen from above that, with the first data transfer method, the slot or the sub-slot during the non-data-transferring time may be distributed to other functional processing operations. This enables the processing ability within one frame to be utilized at all times to the maximum extent. In the first data transfer method, since the distribution of the slot or the sub-slot to other functional processing operations can be set freely, the degree of freedom or flexibility may be improved with the system employing the first data transfer method.

On the other hand, with the second data transfer method, the system throughput, degree of freedom of data transfer and system flexibility may be improved by employing a combination of plural controllers, even although there is a limitation to the throughput with a sole controller.

With the first data transfer apparatus, since the number of slots or sub-slots assigned to the functions per frame may be increased or decreased depending on the importance attached to the functions, the degree of freedom or system flexibility may be improved with the system employing the first data transfer apparatus.

With the second data transfer apparatus, not only the functions may be freely set by software depending on the relative importance attached to the functions, but also the plural control units may be operated in concert with one another. Thus the degree of freedom or flexibility of the system employing the second data transfer apparatus may be improved more pronouncedly than in the first data transfer apparatus.

In addition, with the second data transfer apparatus, by synchronizing the controllers associated with the slot table and by setting the functional information related to the time frame of the slot table associated with the respective controllers, the common functions may be set in certain slots or sub-slots and independent functions may be set in the remaining sub-slots, so that the apparatus has more efficient functions and hence the system in its entirety may be further improved in efficiency.

With the data transfer method of the present invention, by executing the function corresponding to the functional information written in the slot of the slot table a number of times the function is written, the slots or sub-slots during the dwell of data transfer may be distributed to other functional processing operations, thereby enabling the processing ability within one frame to be utilized to the maximum extent at all times. In addition, the distribution to other functional operations can be set freely, thereby improving the degree of freedom or system flexibility.

With the data transfer apparatus of the present invention, the number of slots or sub-sots assigned to the functions per frame may be increased or decreased depending on the importance attached to the functions, thereby further improving the degree of freedom or system flexibility.

With the data transfer apparatus according to the present invention, not only can the functions be freely set by software depending on the relative necessity of the functions, but also the plural second control means may be operated in concert, thereby improving the degree of freedom or system flexibility more pronouncedly than in the above-described data transfer apparatus.

In addition, by supplying the functional information written in the table memory means to external devices, such external devices may be operated in accordance with the functional information, thereby effectively improving the design efficiency.

With the second data transfer apparatus, by synchronizing the devices having table memory means, and by setting the common functional information related to the time frame of the table memory means of the respective devices, it becomes possible to set independent functions in the slots or sub-slots other than those in which the common functions are set, thereby improving the efficiency of the system employing the data transfer apparatus.

What is claimed is:

1. A method for transferring data between plural devices and a main memory having address areas associated with said devices comprising the steps of sequentially reading functional information from a table memory containing therein the functional information indicating plural functions to be executed in transferring said data between said plural devices and said main memory;

selecting said plural functions corresponding to said functional information read from said table memory, wherein said plural functions include accessing a CPU, refreshing said main memory and accessing plural recording/reproducing means; and performing a control operation in accordance with said selected functions.

2. Apparatus for transferring data between plural memories having address areas associated with plural devices and said plural devices comprising a plurality of recording/reproducing means for recording/reproducing data;

first control means for entering or outputting data between said plural memories and said recording/reproducing means and for controlling access to said plural devices;

a plurality of second control means for controlling data input/output between said recording/reproducing means and said plural memories;

table memory means containing therein functional information indicating plural functions to be executed by said apparatus in accessing said plural devices;

means for supplying address information to said table memory means to read out therefrom said functional information;

address generating means for generating said address information for said plural devices associated with said plural memories depending on said functional information contained in said table memory means; and decoding means for outputting function selection signals corresponding to said plural devices responsive to said functional information outputted by said table memory means.

3. The apparatus of claim 2 wherein said functions include accessing CPU, refreshing said plural memories and accessing said plural recording/reproducing means.

4. The apparatus of claim 2 further comprising means for re-writing said functional information contained in said table memory means.

5. The apparatus of claim 2 wherein said plural devices are synchronized with one another, and wherein said functional information related to a time frame of said table memory means of said plural devices are set in common.

\* \* \* \* \*